(12) United States Patent
Volpa

(10) Patent No.: US 7,474,780 B2
(45) Date of Patent: Jan. 6, 2009

(54) METHOD AND APPARATUS FOR DETERMINING UNKNOWN MAGNETIC INK CHARACTERS

(75) Inventor: Peter Volpa, Hammonton, NJ (US)

(73) Assignee: OPEX Corp., Moorestown, NJ (US)

( * ) Notice: Subject to any disclaimer, the term of this patent is extended or adjusted under 35 U.S.C. 154(b) by 1197 days.

(21) Appl. No.: 10/653,693

(22) Filed: Aug. 30, 2003

(65) Prior Publication Data

US 2005/0047641 A1 Mar. 3, 2005

(51) Int. Cl.
G06K 9/00 (2006.01)

(52) U.S. Cl. ...................................... 382/139
(58) Field of Classification Search ................. 382/137, 382/139
See application file for complete search history.

(56) References Cited

U.S. PATENT DOCUMENTS

| | | | |
|---|---|---|---|
| 3,096,506 A * | 7/1963 | Chow et al. ................. | 382/139 |
| 4,126,779 A * | 11/1978 | Jowers et al. ................. | 705/40 |
| 4,547,899 A | 10/1985 | Nally et al. | |
| 4,567,609 A | 1/1986 | Metcalf | |
| 4,742,556 A | 5/1988 | Davis, Jr. et al. | |
| 4,797,938 A | 1/1989 | Will | |
| 4,817,176 A | 3/1989 | Marshall et al. | |
| 4,955,060 A | 9/1990 | Katsuki et al. | |
| 5,033,101 A | 7/1991 | Sood | |
| 5,052,044 A | 9/1991 | Gaborski | |
| 5,309,523 A | 5/1994 | Iwaki et al. | |
| 5,719,949 A | 2/1998 | Koeln et al. | |
| 5,729,621 A | 3/1998 | Marshall et al. | |
| 5,748,780 A | 5/1998 | Stolfo | |
| 5,867,586 A | 2/1999 | Liang | |
| 5,959,279 A | 9/1999 | Komatsu | |
| 6,081,621 A | 6/2000 | Ackner | |
| 6,122,401 A | 9/2000 | Nagao | |
| 6,311,846 B1 * | 11/2001 | Hayduchok et al. ......... | 209/3.3 |
| 6,373,965 B1 | 4/2002 | Liang | |

* cited by examiner

Primary Examiner—Tom Y Lu
(74) Attorney, Agent, or Firm—Stephen Eland; Dann, Dorfman, Herrell & Skillman

(57) ABSTRACT

An apparatus and method for processing documents is provided. Preferably the apparatus includes a plurality of document processing features operable for processing a variety of documents, such as incoming mail. The apparatus may include a feeder for feeding the documents from a sack of documents, an extraction station for extracting documents from envelopes, an optical scanner for scanning optical images of the documents, a orientation detection station for determining the orientation of the documents, a MICR station for identifying unknown magnetic ink markings and a sorting station for sorting the documents. The documents include a document having an unknown magnetic marking that is magnetized and then scanned to obtain a plurality of data points indicative of the unknown marking. Using cross correlation, the data for the unknown marking is then compared with a series of models corresponding to a series of known magnetic markings. The unknown marking is determined to be the marking corresponding to the model that most closely correlates to the unknown marking.

58 Claims, 5 Drawing Sheets

METHOD AND APPARATUS FOR DETERMINING UNKNOWN MAGNETIC INK CHARACTERS

FIELD OF THE INVENTION

The present invention relates generally to the field of document processing and specifically to identifying characters printed in magnetic ink. More specifically, the present invention relates to the field of identifying MICR characters printed on documents, such as checks.

BACKGROUND OF THE INVENTION

In the field of document processing, characters are sometimes printed in magnetic ink. One such example is the printing of MICR characters on the bottom of checks. When processing documents it is often desirable to extract information from the documents so that the information can be retrieved during subsequent processing of the documents. Therefore, in certain applications it is desirable to read the characters that are printed in magnetic ink when processing the documents.

One of the shortcomings of the known methods of reading magnetic ink characters is that the read rates are not high enough for certain applications. For instance, although the typical read rates are quite high (on the order of 95%), some applications require read rates as high as 99% or higher.

SUMMARY OF THE INVENTION

Accordingly, the present invention provides an improved method and apparatus that address the shortcomings of the known methods for reading magnetic ink characters. In one aspect, the present invention provides a method wherein an unknown character on a document printed with magnetic ink is magnetized. The magnetized ink is then scanned by a read head to provide a set of data corresponding to the unknown character. Using cross correlation, the data for the unknown character is compared to a series of data sets that correspond to known characters. The unknown character is then determined to be the character corresponding to the known data set that most closely correlates to the data for the unknown character.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
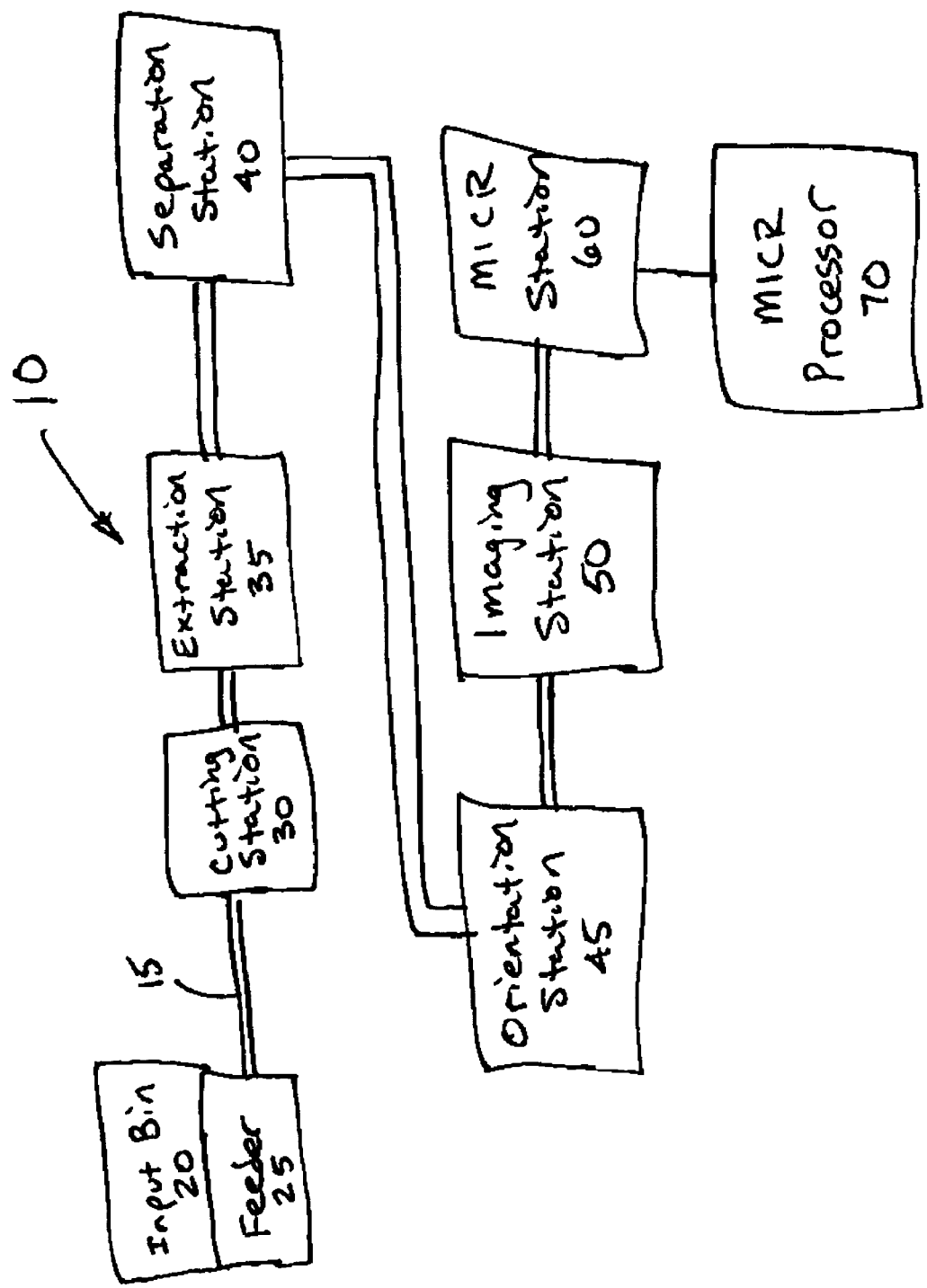
FIG. 1 is a diagrammatic illustration of an apparatus according to the present invention.

Referring now to the figures, wherein like elements are numbered alike throughout, an apparatus for processing documents is designated generally 10. The device 10 preferably includes numerous features for processing documents, such as mail, including such features as an input bin 20 for receiving a stack of mail, a feeder 25 for serially feeding the envelopes into a transport path 15, a cutter 30 for cutting open the envelopes, and an extraction station 35 for extracting the documents from the envelopes. Preferably, the device 10 further includes a separation station 40 for separating packets of documents from an envelope so that the documents in an envelope are then serially fed along the transport. In addition, the device preferably includes an imaging station 50 for acquiring images of the documents, and an orientation station 45 that is operable to reorient the documents into a desired orientation by selectively flipping, twisting, and/or reversing the documents. Furthermore, the device includes a MICR station 60 for detecting and reading magnetic markings on a document.

Although, all of the above referenced features are not necessary for the implementation of the present invention, the present invention is preferably incorporated into an automated document processing machine, such as the apparatus disclosed in U.S. Pat. No. 5,842,577 or the apparatus disclosed in U.S. Pat. No. 5,460,273, each of which are hereby incorporated herein by reference.

Figure 2:
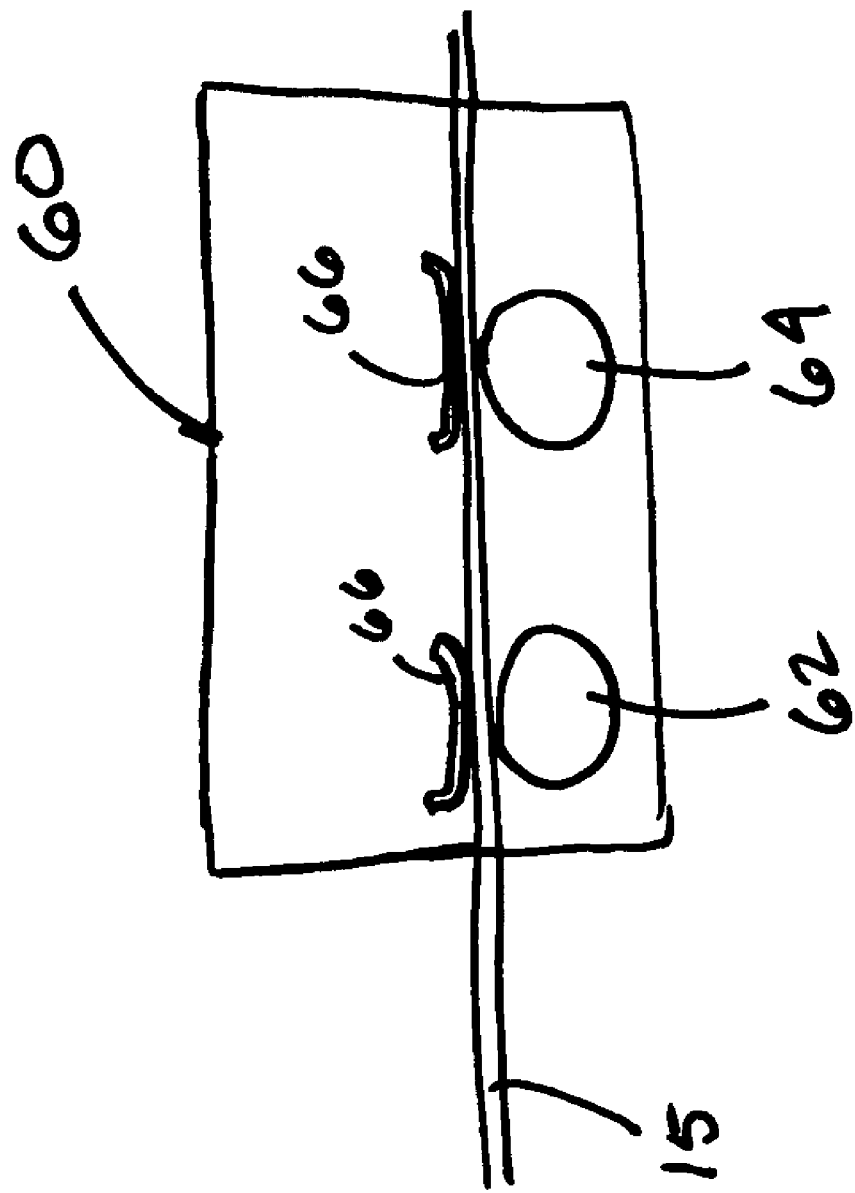
FIG. 2 is a diagrammatic view of a MICR station of the apparatus illustrated in FIG. 1.
Figure 3:
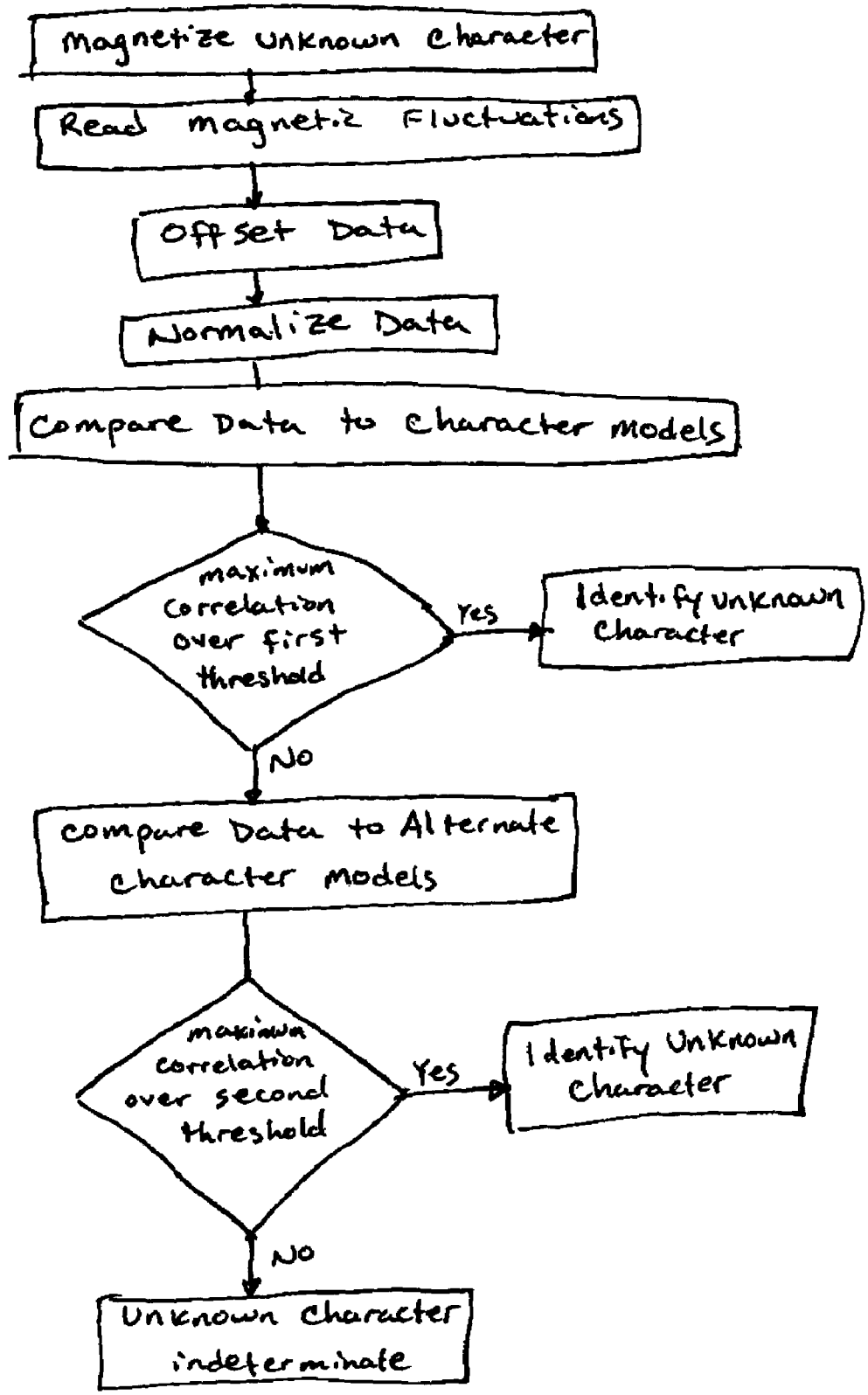
FIG. 3 is a flow chart illustrating a process of identifying magnetic ink markings.

Referring now to FIG. 2, the details of the MICR station will be described in greater detail. The MICR station 60 includes one or more magnetizing or charge heads 62, and one or more read heads 64 located downstream from the charge heads. The charge heads 62 comprise a magnet, such as a permanent magnet or an electromagnet that provides a magnetic field. The read heads are operable to convert a magnetic field into an electrical signal. For instance, preferably the read heads include a coil so that when exposed to a magnetic field, the read heads provide an electrical signal indicative of the change in the strength of the magnetic field. The MICR station 60 either includes or is connected to a MICR processor 70 that receives signals from the read heads 64 and processes the signals to determine the identity of the characters, as discussed further below. In the present instance the MICR processor is a digital signal processor. However, the MICR processor may be in the form of a different type processor, such as a microprocessor.

Preferably, the MICR station is positioned along the transport path so that the transport path conveys the documents past the charge heads 62 and then the read heads 64. To improve the MICR detection, preferably a flexible nonferrous metallic band that urges the documents into contact with each charge heads 62 and read heads 64 as the documents are conveyed along the transport path.

Preferably, the documents are properly oriented before they are fed into the MICR station. Specifically, preferably the documents are oriented so that the documents enter the MICR station lead edge first and front face toward the charge heads 62 and read heads 64. Accordingly, preferably the documents are either oriented into the proper orientation by a separate operation (either manually or automatically) before processing by the device 10 or the device preferably includes an orientation station for automatically detecting the orientation and selectively reorienting the documents as discussed above.

If the documents are properly oriented, the MICR station 60 can be configured with a single charge head 62 and a single read head 64 positioned so that the charge head and read head engage a lower portion of the documents. Specifically, preferably the transport path 15 comprises a pair of opposing belts and the documents are conveyed between the opposing belts. On many documents, such as checks, the MICR line is located on the bottom portion of the document. The belts engage the documents along a middle portion of the documents so that the top portion of the documents project above the belts and the bottom portion projects below the belts. If the documents are properly oriented before entering the MICR station, a single charge head 62 and a single read head 64 can both be positioned below the height of the belts to engage the lower portion of the documents.

Although the documents are preferably reoriented before entering the MICR station, the MICR station can be configured to accommodate mis-oriented documents. Specifically, by employing two charge heads and two read heads, the charge heads and read heads can be positioned both above and below the level of the belts that convey the documents. In this way, the charge heads and read heads can operate on the documents regardless of the orientation of the documents and regardless of the location of the MICR line on the documents. In addition, since the MICR station can operate on the MICR markings through the paper of the document, the MICR station can operate on the documents regardless of whether the front or back face of the document faces the charge heads and the read heads. However, if the document is not properly oriented, the analysis of the data from the read heads may need to be manipulated or analyzed differently, as discussed further below.

As a document passes through the MICR station 60, the charge head imparts a magnetic charge onto the magnetic ink of the marking on the document. The document is then conveyed past the read heads 64. Since the magnetic ink is magnetized, the magnetic ink provides a magnetic field that is detected by the read head. More specifically, the read heads 64 detect the magnetic field and produce a voltage signal proportionate to the change in strength of the detected magnetic field. In this way, the voltage signal produced by the read heads 64 varies as the magnetic field strength of the magnetic ink marking varies when it is conveyed past the read head. In other words, if the magnetic ink marking is a straight line of uniform thickness, the magnetic field strength would (ideally) be a continuous magnetic field of constant strength as the magnetic marking passes the read head. Accordingly, the read head would produce a voltage signal having an initial spike up to a peak as the beginning of the line passes the read head, and then a downward slope down to a flat line of zero volts as the line continues past the read head (i.e. since the line is continuous strength, the change in magnetic field strength is zero).

Figure 5:
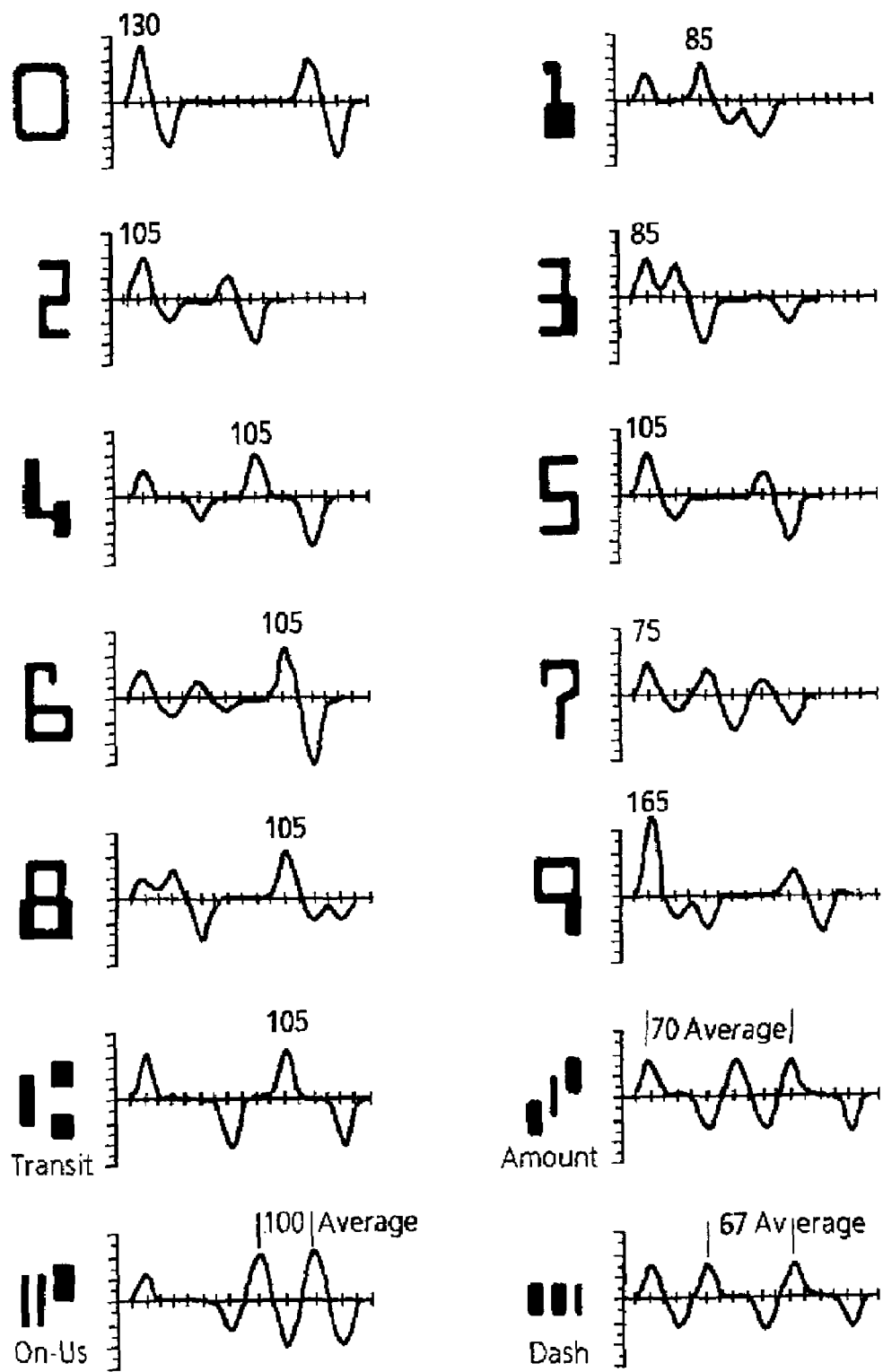
FIG. 5 is a series of chart illustrating waveforms produced by various MICR characters.

MICR characters are designed to produce an output signal that is indicative of the corresponding character. For example, MICR characters printed according to the E-13B standard produce a waveform that has peaks and troughs that are unique to each character. In other words, as the MICR character passes the read head, the character is printed so that the magnetic field strength should increase and decrease according to a particular wave form that is indicative of the particular character. The E-13B MICR characters and the corresponding waveforms are shown in FIG. 5.

Since the waveform for each MICR character is unique, an unknown MICR character can be determined by comparing its waveform with the known MICR character waveforms. Accordingly, as a document passes the read head 64, the read head provides an output signal indicative of the change in magnetic field strength. Specifically, the read head provides a signal of varying strength to the MICR processor 70 as a character is conveyed past the read head. The MICR processor 70 then samples the signal at a plurality of points to provide a plurality of data points (preferably 128) indicative of the signal received from the read head 64. The data points are then stored in the MICR processor 70 for further processing and analysis.

Since MICR markings are typically printed as a series of marking, the MICR processor separates the data so that the data for one character is separated from the data for the previous character and the data for each subsequent character. In addition, since it is desirable to identify the series of MICR markings for a particular document, the MICR processor identifies the beginning and end of the series of MICR characters and associates the MICR character series with the corresponding document after the MICR characters are identified. Accordingly, preferably the MICR processor is operable to identify the series of MICR characters and export the information so that the MICR information can be stored in a data file for the corresponding document.

The MICR processor 70 analyzes the data for an unknown magnetic marking that is scanned by the MICR station by comparing the data for the unknown marking with samples or models that correspond to known MICR markings. The MICR processor determines which model most closely matches the data from the unknown marking and then identifies the unknown marking as the MICR marking corresponding to such model. The MICR processor repeats this analysis for each separate marking identified on a document.

The MICR processor compares the data for an unknown marking with the models for the known MICR characters using cross correlation. Specifically, the model for each known character comprises a series of data points indicative of the character. For instance, in the case of MICR font E13B, the data would correspond to a series of data points that would form a curve in the appropriate shape illustrated in FIG. 5.

The cross correlation analysis performed by the MICR processor 70 is performed according to the following analysis. Each data point in the data set for the unknown marking is multiplied by the corresponding data point in the data set for the first model. These products are then summed to provide a cross correlation value. For instance, the value of the first data point in the unknown marking set is multiplied by the value of the first data point in the first model. In the preferred example using 128 samplings, this would result in a series of 128 products, which would then be summed together to result in a correlation value.

The timing of the beginning of the data set for the unknown marking is important in ensuring that it correlates correctly with the appropriate model. For instance, if the waveform for the unknown marking is the same shape as the waveform for the number zero, but the waveform is shifted over to the right (a shift in time, since the waveform is a function of voltage versus time), the correlation analysis will not result in a close correlation even though the shape of the waveforms is similar. To account for this, the cross correlation is repeated a number of times while shifting the data points to account for the possible shift in the data (i.e. a shift in the waveform).

To accomplish the shift, the data for each of the models is shifted so that the second data point is considered to be the first data point, the third is considered to be the second, and so on. In other words, the second data point is multiplied against the first data point in the unknown data set, and so on. Preferably, the first data point is then wrapped around so that it is analyzed as the last data point in the set. This shifted data set results in a second correlation value for the unknown marking. The data may be shifted any number of times up to the total number of data points. However, preferably the data is shifted 24 times to produce 24 correlation values for the correlation between each model and the unknown character. Alternatively, rather than shifting the data for each of the models, the data for the unknown character can be shifted similarly to the shifting described above to attempt to align the data sets.

These 24 correlation values are then analyzed so that the greatest of the 24 correlation values is identified as the correlation value between the unknown character and the first model. This process is then repeated for each model so that the data for the unknown character is compared against each model 24 times. In other words, for each model, 24 correlation values are determined and each correlation value is based on the summation of 128 numbers (i.e. the product of the values of the corresponding 128 data points). In short the number of computations for each character is equal to the product of the number of data points, the number of shifts and the number of models to which the data is compared. For this reason, it is desirable to limit the analysis to a single type of MICR character to limit the number of models, thereby limiting the amount of computation necessary for each character.

The above cross correlation value can be summarized by the following equation:

$$r_i = \sum_{k=0}^{N-1} X_k * Y_{mod(i+k,N)}$$

wherein x is the unknown waveform, y is one of the models, N is the total number of samples (e.g., 128), and i is incremented from zero to the number of shifts desired (e.g., 24). In addition, mod refers to a modulo operator. Mod (AB) gives the remainder from the division of A/B.

As discussed above, the cross correlation of the data for an unknown character will result in a number of cross correlation values (one value for each model). The process may operate by simply assuming that the unknown character is the character corresponding to whichever model results in the highest correlation value. However, it is possible that the unknown marking is a stray marking or is an improperly printed marking. In such an instance, there will be a maximum correlation value, but the maximum will be lower than expected for a marking that actually correlates to an expected marking. Accordingly, if the maximum correlation value is below a threshold, the marking is not identified as one of the known characters. The marking is then either identified as an unknown marking or the data for the unknown marking is further analyzed as discussed below.

Various factors can affect the correlation between the data for the unknown character and the data for the models, leading to an improper correlation. One such factor is the amplitude of the data for the unknown marking. Variations in the printed magnetic marking can affect the amplitude. For instance, the magnetic ink is made magnetizable by ferrous particles that are mixed in with the ink. If the ratio of ferrous particles to ink is more or less than the anticipated amount, the magnetic field of the ink will be greater or less than expected. Similarly, if the ink is printed more lightly than expected (such as when an ink cartridge is running low), the magnetic field of the marking will be less than expected.

To compensate for the potential variations in amplitude, preferably the data is normalized. Specifically, preferably each correlation value determined for each model is normalized by dividing the correlation value by a normalization factor. Once normalized, the correlation value will range from zero (meaning no correlation) to one (meaning perfect correlation). The normalization factor is determined by summing the squared value of each data point for the unknown marking and multiplying this sum by the sum of the squared value of each data point for the relevant model. The square root of this product is then taken to provide the normalization value. In other words, the normalization factor can be summarized according to the following equation:

$$\text{normalization factor} = \sqrt{\left(\sum_{k=0}^{N-1} X_k^2\right)\left(\sum_{k=0}^{N-1} Y_k^2\right)}$$

Another factor affecting the analysis of the data for the unknown marking can be an upward or downward offset of the data. To compensate for this offset, preferably, the data for the unknown marking and the data for the models can be offset by a factor equal to the mean value for the data set. In other words each data point in a data set is shifted by a factor equal to the sum of the data points divided by the number of data points. In other words, $$X_k = X_k - \frac{\sum_{k=0}^{N-1} X_k}{N} \text{ and } Y_k = Y_k - \frac{\sum_{k=0}^{N-1} Y_k}{N}$$

Figure 4:
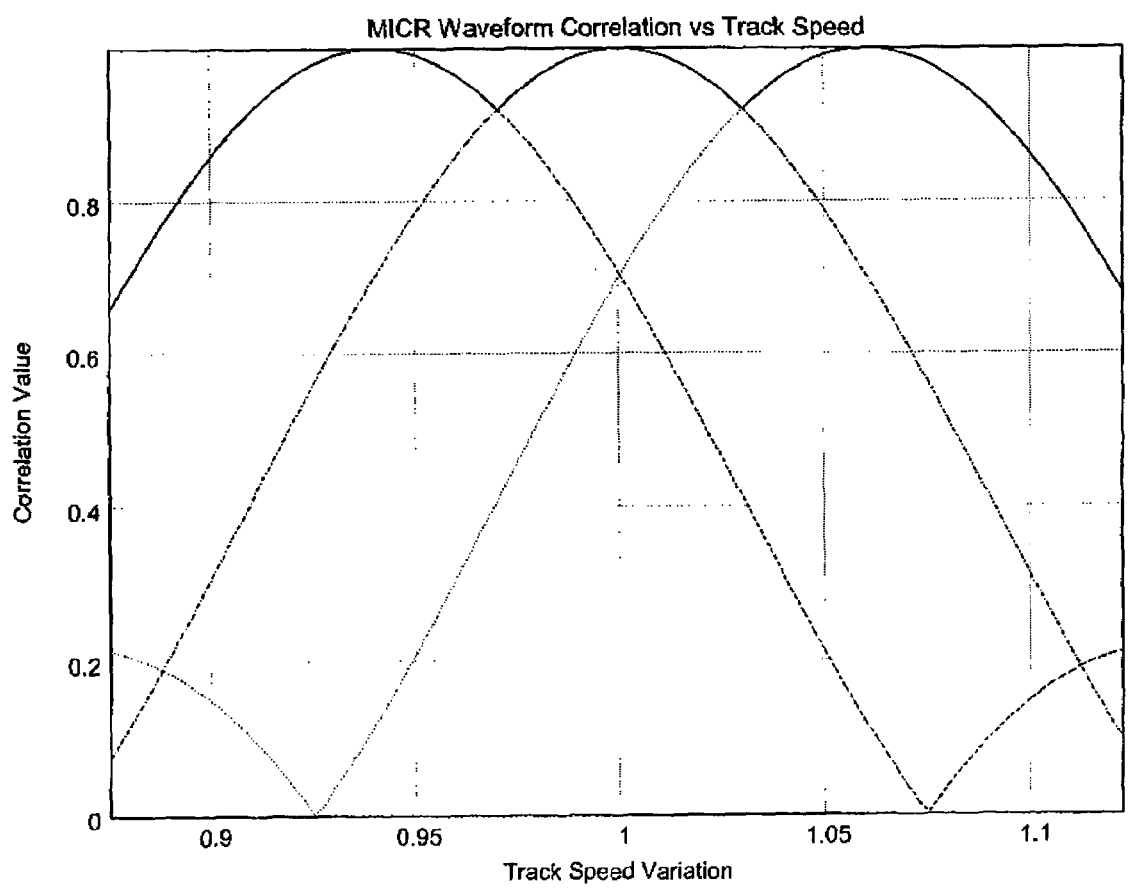
FIG. 4 is a chart illustrating MICR waveform correlation versus transport speed.

Yet another factor that can affect the correlation is the transport speed. If the transport speed is faster than expected, the waveform for the unknown marking would be compressed, whereas if the transport speed is slower than expected the waveform would be elongated. It has been determined that a variation in track speed by as little as approximately 6 percent can sufficiently affect the correlation to lead to either an incorrect identification of the character or a low enough correlation that the character is rejected. The comparison of MICR waveform correlation and transport speed is illustrated graphically in FIG. 4. To compensate for the potential variation in transport speed, preferably a series of alternate models is provided for instances in which the transport speed is 3 percent faster or more, and a second alternate series of models is provided for instances in which the transport speed is three percent slower or more.

The alternate series of models are utilized as follows. The time that it takes the unknown character to pass by the MICR reader 64 can be measured by the MICR station. If the time is shorter than the time that it should take a MICR character to pass by the read heads 64, the MICR processor 70 assumes that the transport speed is too fast, and the series of models corresponding to a fast transport speed are utilized for the cross correlation analysis. Similarly, if the time is longer than the appropriate time for a MICR character to pass the read heads 64, then it is assumed that the transport speed is too slow and the series of models corresponding to a slow transport are utilized for the cross correlation analysis.

Additionally, noise and other variables can affect the output signal from the read heads, causing the signal to be foreshortened or stretched relative to the actual length of the signal. As a result, the wrong series of models may be utilized for the cross correlation analysis. If the wrong series of models is used, the maximum correlation value will not be as great as it would be if the proper series of models is used. Accordingly, if the maximum correlation value is below a pre-determined threshold, then the analysis for the data of the unknown character is also performed using one of the other two series of models. Specifically, the duration of the signal from the read head is analyzed to determine which of the two other sets of models should be used. The set of models that most closely relates to the duration of the signal is used. For instance, if the signal duration is two percent longer than expected, the nominal speed models are used for the cross correlation. However, if the correlation value using these models is not above a threshold, the analysis is performed using the models corresponding to a slow transport speed, since those models more closely correspond to signal duration (i.e. 2% slow is closer to 3% slow than to 3% fast). The maximum correlation value for all of the models used is then utilized to identify the unknown character. It should be noted however, that if the signal duration is unusually high or low and the correlation value is below the secondary threshold, then a second analysis using a second set of models is not performed, because it is assumed that the correlation will not improve.

As described above, two thresholds may be utilized. An absolute threshold for determining whether there is sufficient correlation to identify the unknown character, and a secondary threshold for determining whether the alternate series of models should be used. In the present instance, the absolute threshold is approximately 0.76 and the secondary threshold is approximately 0.86.

Yet another factor that affects the analysis of the character recognition is the orientation of the documents. As discussed above, preferably the documents are properly oriented. If a document is mis-oriented, the data from the read head 64 will not properly correlate with the models. For instance, if the document enters the MICR station 60 backwards (i.e. trailing edge first), the detected data will be backwards relative to the models. Therefore, if the correlation for an unknown character is below a threshold, rather than rejecting the character as being unable to be identified, the data may be manipulated to account for the possibility that the document was mis-oriented. The correlation analysis can then be performed on the manipulated data.

More specifically, the data is manipulated by reversing the data (i.e. re-ordering the data). The first data point is re-ordered as the last data point, the second data point is re-ordered as the second-to-last data point, and so forth. The re-ordered data is then analyzed to correlate the data with the character models.

As can be appreciated from the foregoing, if the orientation of the documents is random, the computation to evaluate each document can be doubled. Accordingly, if the orientation of the documents is random, it may be desirable to determine the orientation of the document before attempting to analyze the unknown marking or markings on the document. The scanned data for the documents can then be manipulated as necessary to account for the orientation of the document before analyzing the data to identify the unknown marking.

The orientation of the documents can be determined according to one of a variety of ways. For instance, if the location of the unknown marking is expected at a particular location on the document, then the orientation of the document can be determined based upon the distance the marking is located from either the leading edge or the trailing edge. For example, for identifying the location of characters in a MICR line on a check, the MICR line is typically located in the lower left hand corner of a check, and the length of a MICR line on a check falls within a pre-determined range. Therefore, the orientation of a check can be determined by the distance from the leading edge of the document to the first detected magnetic ink marking. If the distance is below a threshold, then the check entered the MICR station with the left edge leading. If the distance is above a threshold, then the check entered the MICR station with the right edge leading.

In the foregoing discussion, the analysis is described in connection with E13B MICR characters. However, the methodology is also particularly suited to identify other types of MICR characters, such as CMC-7 type MICR character, which are characters formed by a series of spaced apart bars. The length of the bars vary as well as the spacing between the bars that form each character. Based on these characteristics a series of models can be created that correspond to each of the CMC-7 characters.

Similarly, the discussion describes a particular type of cross correlation that is suitable for use. However, it will be recognized that variations on the cross correlation analysis can be made and still be considered cross correlation as that term is used herein. For instance, in certain instances it may be desirable to use cross correlation implemented by using a Fast Fourier Transform approach. Such an approach is still a cross correlation analysis as that term is used herein. More specifically, the term cross correlation as used herein is meant to encompass any correlation analysis that measures the similarity between two different data sets computed by the sum of the cross products between the two data sets, and particularly the cross product at different lags.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A method for identifying an unknown MICR character on a document, comprising the steps of:
    providing a document within an envelope, wherein the document has an unknown MICR character printed with magnetic ink;
    extracting the document from the envelope;
    imparting a magnetic charge onto the magnetic ink to magnetize the unknown character;
    scanning the unknown character with a magnetic read head to obtain a set of data indicative of the unknown character;
    providing a plurality of predetermined data sets wherein each data set corresponds to a particular MICR character;
    determining a correlation value of the similarity between each of the predetermined data sets and the data set for the unknown character using cross correlation;
    determining a normalization value for the cross correlation of each data set and the data set of the unknown character and dividing the correlation value by the normalization value;
    identifying the maximum correlation value; and
    identifying the unknown character as the MICR character corresponding to the data set having the maximum correlation value.

2. The method of claim 1 wherein the step of determining a correlation value using cross correlation comprises the step of determining the sum of the cross product between each of the predetermined data sets and the data set for the unknown character.

3. The method of claim 1 comprising the steps of:
    incrementally shifting the data to re-order the data for the unknown MICR character to provide a plurality of re-ordered data sets for the unknown MICR character;
    determining a correlation value of the similarity between each of the predetermined data sets and each of the re-ordered data sets for the unknown character using cross correlation.

4. The method of claim 1 comprising the steps of:
incrementally shifting the data to re-order the data for each of the predetermined data sets to provide a plurality of re-ordered data sets for each of the predetermined data sets;
determining a correlation value of the similarity between each of the re-ordered predetermined data sets and the data set for the unknown character using cross correlation.

5. The method of claim 1 comprising the steps of determining an offset value for each data set based upon the corresponding mean value of each data set, and offsetting each data point in each data set by the corresponding offset value.

6. The method of claim 1 wherein the step of scanning comprises conveying the document past the magnetic read head and measuring the magnetic field strength as the document passes the read head.

7. The method of claim 1 comprises the step of an alternative comparison, comprising the steps of:
providing a plurality of alternate data sets corresponding to the MICR characters;
determining a correlation value of the similarity between each of the alternate data sets and the data set for the unknown character using cross correlation;
identifying the maximum correlation value of both the predetermined data sets and the alternate data sets; and
identifying the unknown character as the MICR character corresponding to the data set having the maximum correlation value.

8. The method of claim 7 comprising the step of determining whether the maximum correlation value exceeds a threshold and the alternate comparison is performed if the correlation value does not exceed the threshold.

9. The method of claim 7 wherein the method comprises determining the length of time that it takes the character to pass the read heads, and the alternate comparison is performed if the length of time is above a time threshold.

10. The method of claim 7 wherein the method comprises determining the length of time that it takes the character to pass the read heads, and the alternate comparison is performed if the length of time is below a time threshold.

11. The method of claim 1 comprising the steps of scanning the document to obtain a set of optical image data corresponding to the document, and exporting the optical image data and data regarding the identified MICR character to a data file for the document.

12. The method of claim 1 comprising the steps of determining the orientation of the document and selectively re-orienting the document.

13. The method of claim 12 comprising the step of sorting the document in response to a detected characteristic of the document.

14. The method of claim 1 wherein each cross correlation in the step of determining a correlation value comprises cross correlating the data set for the unknown character and one of the predetermined data sets by determining the product of each data point in the data set for the unknown character with the corresponding data point in the one predetermined data set and summing the products.

15. A method for identifying an unknown MICR character on a document, comprising the steps of:
providing a document having an unknown MICR character printed with magnetic ink;
imparting a magnetic charge onto the magnetic ink to magnetize the unknown character;
scanning the unknown character with a magnetic read head to obtain a set of data indicative of the unknown character;
providing a plurality of predetermined data sets wherein each data set corresponds to a particular MICR character;
determining an offset value for each data set based upon the corresponding mean value of each data set, and offsetting each data point in each data set by the corresponding offset value
determining a correlation value of the similarity between each of the predetermined data sets and the data set for the unknown character using cross correlation;
identifying the maximum correlation value; and
identifying the unknown character as the MICR character corresponding to the data set having the maximum correlation value.

16. The method of claim 15 wherein the step of determining a correlation value using cross correlation comprises the step of determining the sum of the cross product between each of the predetermined data sets and the data set for the unknown character.

17. The method of claim 15 comprising the step of determining a normalization value for the cross correlation of each data set and the data set of the unknown character and dividing the correlation value by the normalization value.

18. The method of claim 15 wherein the step of scanning comprises conveying the document past the magnetic read head and measuring the magnetic field strength as the document passes the read head.

19. The method of claim 15 comprises the step of an alternative comparison, comprising the steps of:
providing a plurality of alternate data sets corresponding to the MICR characters;
determining a correlation value of the similarity between each of the alternate data sets and the data set for the unknown character using cross correlation;
identifying the maximum correlation value of both the predetermined data sets and the alternate data sets; and
identifying the unknown character as the MICR character corresponding to the data set having the maximum correlation value.

20. The method of claim 19 comprising the step of determining whether the maximum correlation value exceeds a threshold and the alternate comparison is performed if the correlation value does not exceed the threshold.

21. The method of claim 19 wherein the method comprises determining the length of time that it takes the character to pass the read heads, and the alternate comparison is performed if the length of time is above a time threshold.

22. The method of claim 19 wherein the method comprises determining the length of time that it takes the character to pass the read heads, and the alternate comparison is performed if the length of time is below a time threshold.

23. The method of claim 15 comprising the steps of scanning the document to obtain a set of optical image data corresponding to the document, and exporting the optical image data and data regarding the identified MICR character to a data file for the document.

24. The method of claim 15 comprising the steps of determining the orientation of the document and selectively re-orienting the document.

25. The method of claim 24 comprising the step of sorting the document in response to a detected characteristic of the document.

26. The method of claim 15 wherein each cross correlation in the step of determining a correlation value comprises cross correlating the data set for the unknown character and one of the predetermined data sets by determining the product of each data point in the data set for the unknown character with the corresponding data point in the one predetermined data set and summing the products.

27. The method of claim 15 comprising the steps of:
incrementally shifting the data to re-order the data for the unknown MICR character to provide a plurality of re-ordered data sets for the unknown MICR character;
determining a correlation value of the similarity between each of the predetermined data sets and each of the re-ordered data sets for the unknown character using cross correlation.

28. The method of claim 15 comprising the steps of:
incrementally shifting the data to re-order the data for each of the predetermined data sets to provide a plurality of re-ordered data sets for each of the predetermined data sets;
determining a correlation value of the similarity between each of the re-ordered predetermined data sets and the data set for the unknown character using cross correlation.

29. A method for identifying an unknown marking on a document, comprising the steps of:
providing a document having an unknown marking printed with magnetic ink;
magnetizing the unknown marking;
scanning the document to obtain a set of data indicative of the magnetized marking;
providing a plurality of predetermined data sets wherein each data set corresponds to a known marking;
determining a correlation value of the similarity between each of the predetermined data sets and the data set for the unknown marking, wherein each correlation value is based on the summation of the cross product of the data set for the unknown marking and one of the predetermined data sets;
incrementally shifting the data to re-order the data for the unknown marking to provide a plurality of re-ordered data sets for the unknown marking;
determining a correlation value of the similarity between each of the predetermined data sets and each of the re-ordered data sets for the unknown marking using cross correlation; and
identifying the unknown marking as the marking corresponding to the data set having the maximum correlation value.

30. The method of claim 29 comprising the steps of determining an offset value for each data set based upon the corresponding mean value of each data set, and offsetting each data point in each data set by the corresponding offset value.

31. The method of claim 29 comprising the step of determining a normalization value for the cross correlation of each data set and the data set of the unknown marking and dividing the correlation value by the normalization value.

32. The method of claim 29 wherein the step of scanning comprises conveying the document past a magnetic read head and measuring the magnetic field strength as the document passes the read head.

33. The method of claim 29 comprises the step of an alternative comparison, comprising the steps of:
providing a plurality of alternate data sets corresponding to the known markings;
determining a correlation value of the similarity between each of the alternate data sets and the data set for the unknown marking using cross correlation;
identifying the maximum correlation value of both the predetermined data sets and the alternate data sets; and
identifying the unknown marking as the marking corresponding to the data set having the maximum correlation value.

34. The method of claim 33 comprising the step of determining whether the maximum correlation value exceeds a threshold and the alternate comparison is performed if the correlation value does not exceed the threshold.

35. The method of claim 33 wherein the method comprises determining the length of time that it takes the character to scan the marking, and the alternate comparison is performed if the length of time is above a time threshold.

36. The method of claim 33 wherein the method comprises determining the length of time that it takes the character to scan the marking, and the alternate comparison is performed if the length of time is below a time threshold.

37. The method of claim 29 comprising the steps of scanning the document to obtain a set of optical image data corresponding to the document, and exporting the optical image data and data regarding the identified marking to a data file for the document.

38. The method of claim 29 comprising the steps of determining the orientation of the document and selectively manipulating either the data set for the unknown marking or the data sets for the known markings.

39. The method of claim 38 comprising the step of sorting the document in response to a detected characteristic of the document.

40. A method for identifying an unknown marking on a document, comprising the steps of:
providing a document having an unknown marking printed with magnetic ink;
magnetizing the unknown marking;
scanning the document to obtain a set of data indicative of the magnetized marking;
providing a plurality of predetermined data sets wherein each data set corresponds to a known marking;
determining a correlation value of the similarity between each of the predetermined data sets and the data set for the unknown marking, wherein each correlation value is based on the summation of the cross product of the data set for the unknown marking and one of the predetermined data sets;
incrementally shifting the data to re-order the data for each of the predetermined data sets to provide a plurality of re-ordered data sets for each of the predetermined data sets;
determining a correlation value of the similarity between each of the re-ordered predetermined data sets and the data set for the unknown character using cross correlation; and
identifying the unknown marking as the marking corresponding to the data set having the maximum correlation value.

41. The method of claim 40 comprising the steps of determining an offset value for each data set based upon the corresponding mean value of each data set, and offsetting each data point in each data set by the corresponding offset value.

42. The method of claim 40 comprising the step of determining a normalization value for the cross correlation of each data set and the data set of the unknown marking and dividing the correlation value by the normalization value.

43. The method of claim 40 wherein the step of scanning comprises conveying the document past a magnetic read head and measuring the magnetic field strength as the document passes the read head.

44. The method of claim 40 comprises the step of an alternative comparison, comprising the steps of:
- providing a plurality of alternate data sets corresponding to the known markings;
- determining a correlation value of the similarity between each of the alternate data sets and the data set for the unknown marking using cross correlation;
- identifying the maximum correlation value of both the predetermined data sets and the alternate data sets; and
- identifying the unknown marking as the marking corresponding to the data set having the maximum correlation value.

45. The method of claim 44 comprising the step of determining whether the maximum correlation value exceeds a threshold and the alternate comparison is performed if the correlation value does not exceed the threshold.

46. The method of claim 44 wherein the method comprises determining the length of time that it takes the character to scan the marking, and the alternate comparison is performed if the length of time is above a time threshold.

47. The method of claim 44 wherein the method comprises determining the length of time that it takes the character to scan the marking, and the alternate comparison is performed if the length of time is below a time threshold.

48. The method of claim 40 comprising the steps of scanning the document to obtain a set of optical image data corresponding to the document, and exporting the optical image data and data regarding the identified marking to a data file for the document.

49. The method of claim 40 comprising the steps of determining the orientation of the document and selectively manipulating either the data set for the unknown marking or the data sets for the known markings.

50. A method for identifying an unknown MICR character on a document, comprising the steps of:
- providing a document having an unknown MICR character printed with magnetic ink;
- imparting a magnetic charge onto the magnetic ink to magnetize the unknown character;
- scanning the unknown character with a magnetic read head to obtain a set of data indicative of the unknown character;
- providing a plurality of predetermined data sets wherein each data set corresponds to a particular MICR character;
- determining a correlation value of the similarity between each of the predetermined data sets and the data set for the unknown character using cross correlation;
- providing a plurality of alternate data sets corresponding to the MICR characters;
- determining a correlation value of the similarity between each of the alternate data sets and the data set for the unknown character using cross correlation;
- identifying the maximum correlation value of both the predetermined data sets and the alternate data sets; and
- identifying the unknown character as the MICR character corresponding to the data set having the maximum correlation value.

51. The method of claim 50 wherein the step of determining a correlation value using cross correlation comprises the step of determining the sum of the cross product between each of the predetermined data sets and the data set for the unknown character.

52. The method of claim 50 wherein the step of scanning comprises conveying the document past the magnetic read head and measuring the magnetic field strength as the document passes the read head.

53. The method of claim 50 comprising the step of determining whether the maximum correlation value exceeds a threshold and the alternate comparison is performed if the correlation value does not exceed the threshold.

54. The method of claim 50 wherein the method comprises determining the length of time that it takes the character to pass the read heads, and the alternate comparison is performed if the length of time is above a time threshold.

55. The method of claim 50 wherein the method comprises determining the length of time that it takes the character to pass the read heads, and the alternate comparison is performed if the length of time is below a time threshold.

56. The method of claim 50 comprising the steps of scanning the document to obtain a set of optical image data corresponding to the document, and exporting the optical image data and data regarding the identified MICR character to a data file for the document.

57. The method of claim 50 comprising the steps of determining the orientation of the document and selectively re-orienting the document.

58. The method of claim 50 wherein each cross correlation in the step of determining a correlation value comprises cross correlating the data set for the unknown character and one of the predetermined data sets by determining the product of each data point in the data set for the unknown character with the corresponding data point in the one predetermined data set and summing the products.

* * * * *